(12) United States Patent
Dobson

(10) Patent No.: US 6,943,729 B2
(45) Date of Patent: Sep. 13, 2005

(54) METHOD AND SYSTEM FOR TIME DIFFERENCE OF ARRIVAL (TDOA) LOCATION SERVICES

(75) Inventor: W. Kurt Dobson, Sandy, UT (US)

(73) Assignee: S5 Wireless, Inc., Draper, UT (US)

(*) Notice: Subject to any disclaimer, the term of this patent is extended or adjusted under 35 U.S.C. 154(b) by 0 days.

(21) Appl. No.: 10/676,676

(22) Filed: Oct. 1, 2003

(65) Prior Publication Data

US 2005/0073459 A1 Apr. 7, 2005

(51) Int. Cl.$^7$ ................................................ G01S 1/24
(52) U.S. Cl. ........................ 342/387; 342/442; 342/450
(58) Field of Search ....................... 342/357.06, 387, 342/442, 450, 457; 455/456.1, 456.6; 701/213, 215

(56) References Cited

U.S. PATENT DOCUMENTS

| | | | |
|---|---|---|---|
| 3,996,590 A | 12/1976 | Hammack | 343/112 R |
| 4,060,809 A | 11/1977 | Baghdady | 343/112 R |
| 4,252,999 A | 2/1981 | Acampora et al. | 370/104 |
| 4,783,744 A | 11/1988 | Yueh | 364/454 |
| 5,689,269 A | 11/1997 | Norris | 342/357 |
| 5,752,218 A | 5/1998 | Harrison et al. | 701/207 |
| 5,774,829 A * | 6/1998 | Cisneros et al. | 701/213 |
| 5,781,150 A | 7/1998 | Norris | 342/357 |
| 5,952,959 A | 9/1999 | Norris | 342/357 |
| 5,963,130 A | 10/1999 | Schlager et al. | 340/540 |
| 5,990,827 A * | 11/1999 | Fan et al. | 342/357.11 |
| 6,011,974 A * | 1/2000 | Cedervall et al. | 455/456.4 |
| 6,041,222 A | 3/2000 | Horton et al. | 455/255 |
| 6,061,337 A | 5/2000 | Light et al. | 370/331 |
| 6,061,565 A * | 5/2000 | Innes et al. | 455/436 |
| 6,104,978 A | 8/2000 | Harrison et al. | 701/207 |
| 6,184,801 B1 | 2/2001 | Janky | 340/988 |
| 6,198,390 B1 | 3/2001 | Schlager et al. | 340/540 |
| 6,204,813 B1 | 3/2001 | Wadell et al. | 342/463 |
| 6,236,365 B1 | 5/2001 | LaBlanc et al. | 342/457 |
| 6,249,252 B1 | 6/2001 | Dupray | 342/450 |
| 6,252,544 B1 | 6/2001 | Hoffberg | 342/357.1 |
| 6,295,023 B1 | 9/2001 | Bloebaum | 342/357.06 |
| 6,324,213 B1 | 11/2001 | Harrison | 375/240 |
| 6,353,406 B1 | 3/2002 | Lanzl et al. | 342/118 |
| 6,388,611 B1 | 5/2002 | Dillman | 342/357.06 |
| 6,392,692 B1 | 5/2002 | Monroe | 348/143 |
| 6,424,826 B1 | 7/2002 | Horton et al. | 455/255 |
| 6,429,811 B1 | 8/2002 | Zhao et al. | 342/357.09 |
| 6,429,812 B1 | 8/2002 | Hoffberg | 342/357.1 |
| 6,452,544 B1 | 9/2002 | Hakala et al. | 342/357.13 |
| 6,459,704 B1 | 10/2002 | Jandrell | 370/445 |
| 6,477,379 B2 * | 11/2002 | Kingdon | 455/456.1 |
| 6,497,656 B1 | 12/2002 | Evans et al. | 600/300 |
| 6,509,829 B1 | 1/2003 | Tuttle | 340/10.1 |
| 6,560,462 B1 | 5/2003 | Ravi et al. | 455/456 |
| 6,694,142 B1 * | 2/2004 | Kuwahara et al. | 455/456.1 |
| 2001/0051527 A1 * | 12/2001 | Kuwahara et al. | 455/456 |

* cited by examiner

*Primary Examiner*—Dao Phan
(74) *Attorney, Agent, or Firm*—Madson & Metcalf

(57) ABSTRACT

A method and system for determining the location of a mobile transmitting device that uses three dimensional location coordinates to triangulate the location using a time difference of arrival method, with diminishing errors, error correction and which takes advantage of global positioning systems without the requirement of highly accurate clocks in the mobile transmitting device and the base stations.

12 Claims, 2 Drawing Sheets

METHOD AND SYSTEM FOR TIME DIFFERENCE OF ARRIVAL (TDOA) LOCATION SERVICES

BACKGROUND OF INVENTION

1. Field of the Invention

This invention relates to methods and systems for location finding. More specifically this invention relates to location finding methods and systems, which make use of "Time Difference of Arrival."

2. Description of Related Art

A variety of methods and techniques have been proposed for geographic location determination. The most widely used system is the Global Positioning System (GPS). The GPS system is a satellite-based pseudo-ranging location system that is used widely in military and commercial applications. Typical GPS accuracy is less than 10 meters for military applications and 100 meters for commercial applications. Differential GPS (DGPS) has been introduced to improve the location accuracy for commercial applications. GPS provides accurate position information for users in open and unobstructed areas. It requires that at least three satellites be within range of the GPS receiver to provide 2-D position data and four or more satellites to provide 3-D data. Satellite blockage caused by man made or natural structures within urban and/or shadowed environments can render GPS inoperable. Generally such GPS systems do not provide the broad outdoor coverage in an urban and/or shadowed environment. Also, such GPS systems tend to be relatively costly.

Other common position location methods include Direction Finding (DF), hyperbolic methods and Time of Arrival (TDOA). DF techniques generally require steerable antennas or phased-array antenna systems. Although DF techniques can offer substantial spatial resolution and have the ability to locate a number of signals, typically DF systems are highly complex. The complexity translates to high cost, low reliability and often imposes size and power restrictions on the use of the system. While TOA is a simple triangulation method, it requires both the base stations and all of the mobile devices to have highly accurate clocks. This requirement for highly accurate clocks imposes a significant cost impact on the use of the TOA method.

Although the following may not qualify as "prior art," the reader is referred to the following U.S. patent documents for general background material. Each of these referenced patents is hereby incorporated by reference in its entirety for the material contained therein. U.S. Pat. Nos. 3,996,590; 4,060,809; 4,252,999; 4,783,744; 5,689,269; 5,752,218; 5,781,150; 5,952,959; 5,963,130; 6,041,222; 6,061,337; 6,104,978; 6,184,801; 6,198,390; 6,204,813; 6,236,365; 6,252,544; 6,249,252; 6,295,023; 6,324,213; 6,353,406; 6,388,611; 6,392,692; 6,424,826; 6,429,811; 6,429,812; 6,452,544; 6,459,704; 6,497,656; 6,509,829; and 6,560,462.

SUMMARY OF INVENTION

It is desirable to provide a method and system for locating a telemetry communication source position, while minimizing location error. More specifically, it is desirable to provide a method and system for identifying three dimensional location coordinates, using a Time Difference of Arrival (TDOA) method.

Accordingly, it is an object of this invention to provide a method and system for determining a geographic coordinate location that is appropriate for use in a telemetry communication system.

Another object of this invention is to provide a method and system for determining a geographic coordinate location that provides broad outdoor coverage in a shadowed environment.

A further object of this invention is to provide a method and system for determining a geographic coordinate location that does not require the clocks at the receiver sites of interest to be synchronized to the transmitter clock.

A still further object of this invention is to provide a method and system for determining a geographic coordinate location that employs a triangulation technique based on Time Distance of Arrival (TDOA).

Additional objects, advantages, and other novel features of this invention will be set forth in part in the description that follows and in part will become apparent to those of ordinary skill in the art upon examination of the following, or may be learned with the practice of the invention as described herein. The objects and advantages of this invention may realized and attained by means of the instrumentalities and combinations particularly pointed out in the appended claims. Still other objects of the present invention will become readily apparent to those skilled in the art from the following description wherein there is shown and described the preferred embodiment of the invention, simply by way of illustration of one of the modes best suited to carry out this invention. As it will be realized, this invention is capable of other different embodiments, and its several details and specific steps are capable of modification in various aspects without departing from the invention. Accordingly, the objects, drawings and descriptions should be regarded as illustrative in nature and not as restrictive.

BRIEF DESCRIPTION OF DRAWINGS

The accompanying drawings incorporated in and forming a part of the specification, illustrate present preferred embodiments of the invention. Some, although not all alternative embodiments are described in the following description. In the drawings.

Figure 1:
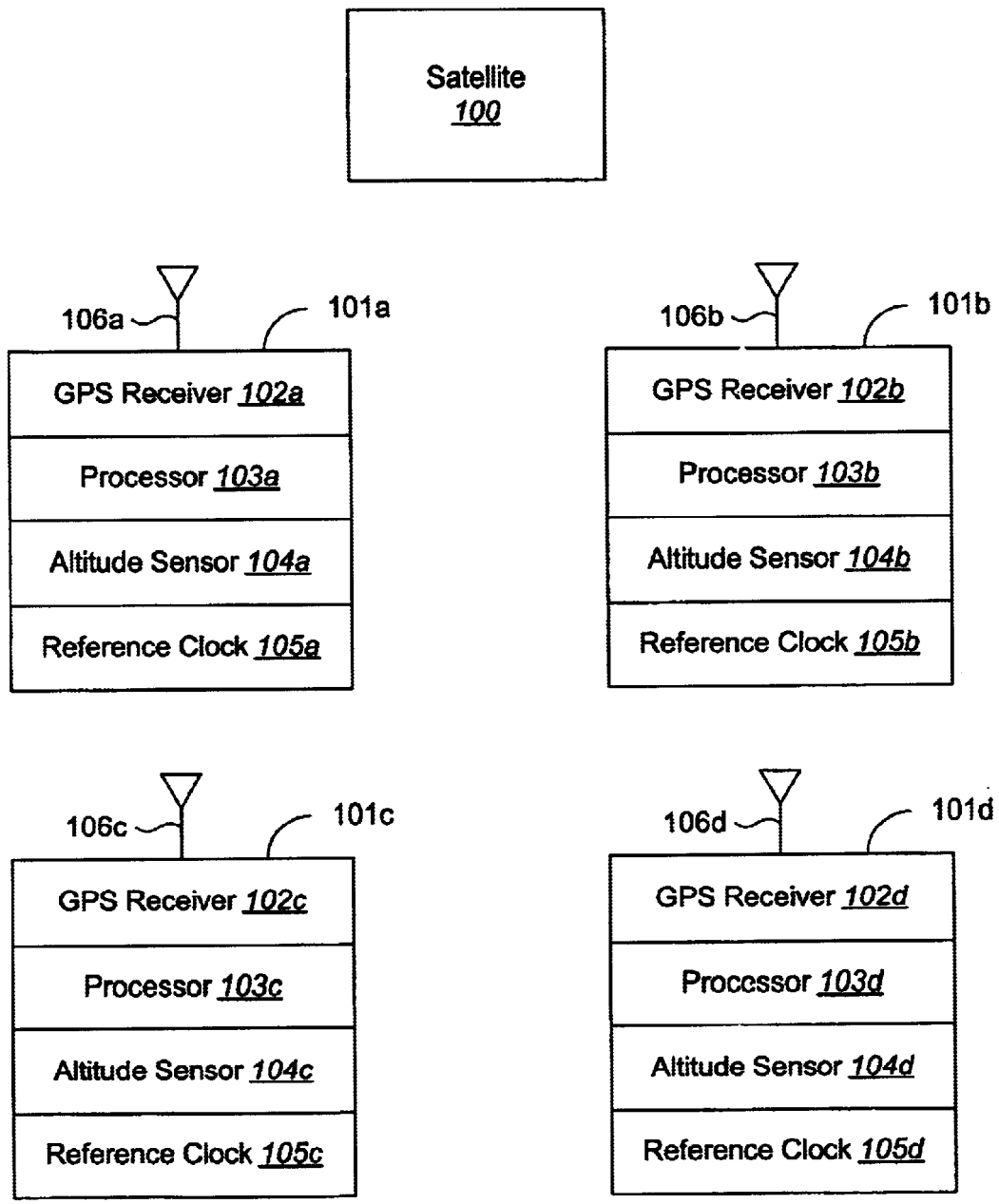
FIG. 1 is a system block diagram showing the major components of one preferred embodiment of the invention.

Reference will now be made in detail to the present embodiments of the invention, examples of which are illustrated in the accompanying drawings.

DETAILED DESCRIPTION

This invention is a method and system for the locating of antenna device that uses a Time Difference of Arrival (TDOA) method. TDOA is a technique that does not require the mobile device that is to be located, to have an incorporated clock. Rather than having known Euclidian distances of the Time of Arrival technique, TDOA uses the range differences between receivers. These range differences can be described as a hyperbolic curve in 2D or a hyperboloid in 3D space. This hyperbolic position location system estimates the location of a source by the intersection of hyperboloids describing range difference measurements between three or more base stations. For example, in the case of a 2D hyperbolic solution to the location finding problem with three base station sites (S1 through S3) and a mobile transmitting device (source) to be located. The relationship between the range differences and the TDOA between the receivers is given by:

$R_{ij} = c \times d_{ij} = R_i - R_j$ where c is the signal propagation speed (speed of light = $3 \times 10^8$ meters/second), d(ij) is the TDOA between receiver i and j. The TDOA estimate, in the absence of noise and interference, restricts the possible source locations to a hyperboloid of revolution with the receiver as the foci.

In a 3D system, the hyperboloids that describe the range differences, R(ij) between receivers are given by:

$R_{ij} = [(X_i - x)^2 + (Y_i - y)^2 + (Z_i - z)^2]^{1/2} - [(X_j - x)^2 + (Y_j - y)^2 + (Z_j - z)^2]^{1/2}$ where [(X(i), Y(i), Z(i)] and [X(j), Y(j), Z(j)] define the location of the receiver i and j respectively. R(ij) is the range difference measurement between base station i and j, and (x,y,z) are the unknown source coordinates.

For the normal solution case, if the number of unknowns or coordinates of the source to be located is equal to the number of equations or range difference measurements, then the system is consistent and a unique solution exists. Therefore, for a 2D system, where the source and the receivers are coplanar, a two-dimensional source location is determined from the intersection of two or more hyperbolas produced from three or more TDOA measurements. While, for a 3D system, the intersection of three or more independently produced hyperboloids generated from four or more TDOA measurements are used.

The triangulation system of this invention uses this TDOA technique. In the present embodiment of this invention, each base station site is provided with a Global Positioning System (GPS) receiver that is used to synchronize the towers to the cesium clock standard used in the GPS system and also provides a 10 nano-second (100 MHz) reference clock that is used in the measurement of the TDOA. Alternative embodiments may uses different and improved GPS systems and can employ different reference clocks without departing from the concept of this invention. This present approach has an inherent system error of plus or minus 10 nsec, which is approximately 1 foot of distance error per nano-second, or about 10 feet of location determination error. Multipath error is the dominant error source in this system.

The solution to the TDOA location finding of this invention uses essentially the same set of equations as in the above described spherical case, but typically the R values are also unknowns. As an example, the following MathCad model, which solves the case for three receiver sites and one particular device position, is shown:

mi:=5280; set 1 mile equal to 5280 feet
site 1:=(0, 0, 0.1)×mi; set positions of towers [1, 2, 3]
site 2: (5, 0, 0.2)×mi
site 3:=(5, 5, 0.3)×mi
noise:=10; position of device in feet
dev:=(3, 4,1)×mi
dev:=($1.584 \times 10^4$, $2.112 \times 10^4$, $5.28 \times 10^3$)
Euclid(a,b):=$[(a_0-b_0)^2+(a_1-b_1)^2+(a_2-b_2)^2]^{1/2}$; generate function to return
; Euclidian distance between 2.
; xyz vectors
c:=(1860005280) c=$9.821 \times 10^8$; speed of light in feet/second
E:=[Euclid(site1,dev)+rnd(noise), ;reported position from towers and noise
Euclid(site2,dev)+rnd(noise), Euclid(site3,dev)+rnd(noise)]
E:=[$2.682 \; 10^4$, $2.399 \times 10^4$, $1.238 \times 10^4$]
T:=100; set realtime stamp to 100
T:=T+E; simply so RF travels in unit time, therefore
T=($2.692 \times 10^4$, $2.409 \times 10^4$, $1.248 \times 10^4$) time at each site is T+E, actual
;formula is T=T+E/c, but the huge
T1=$2.409 \times 10^4$; c value causes scaling problems for
;the solver
$delta_0$:=$(T_0-T_1)$; We also can calculate the delta times between
$delta_1$:=$(T_0 T_2)$; the stations
$delta_2$:=$(T_1-T_2)$
delta=($2.835 \times 10^3$, $1.445 \times 10^4$, $1.161 \times 10^4$)
u:=(3, 3, 0.5)×mile R:=(3, 3, 3)×mile; set guess values for solver
Given; device report z with barometer,
;therefore u[z] is a constraint
$R_0-R_1$=$delta_0$
$R_0-R_2$=$delta_2$
$R_1-R_2$=$delta_2$ $u_2$=$dev_2$; set z to baro altitude
A system of simultaneous equations, given known xyz's of sites, verses unknown (u) xyz's of device to be located, using received Euclidean distances R are solved.
$(site1_0-u_0)^2+(site1_1-u_1)^2+(site1_2-u_2)^2=R_0^2$
$(site2_0-u_0)^2+(site2_1-u_1)^2+(site2_2-u_2)^2=R_1^2$
$(site3_0-u_0)^2+(site3_1-u_1)^2+(site3_2-u_2)^2=R_2^2$
Triangulate(u,R):=Minerr(u,R)
ans:=Trangulate(u,R)
cdev:=ans0
cdev=($1.584 \times 10^4$, $2.112 \times 10^4$, $5.28 \times 10^3$)
dev=($1.584 \times 10^4$, $2.112 \times 10^4$, $5.28 \times 10^3$)
cdev−dev=(−2.075, −2.34, 0)

FIG. 1 shows a system block diagram showing the major components of one preferred embodiment of the invention. A satellite system 100 is used to facilitate and the operation of the GPS receiver 102a–d located in the base stations 101a–d. The GPS receiver 102a–d locks the base station 101a–d clocks 105a–d to the NTSB Cesium clock standard. In the present embodiment of the invention, both the carrier frequency as well as the A/D sampling clocks of the base station 101a–d are locked and derived from a 10 MHz signal provided by the GPS receiver. Each base station 101a–d is provided with a GPS receiver 102a–d, a processing unit 103a–d, an altitude (typically barometric) sensor 104a–d and, in the present embodiment, a reference clock 105a–d. The GPS receivers 102a–d are preferably provided with an antenna 106a–d, that is in electronic communication with the GPS receiver 102a–d. The GPS receiver 102a–d, the altitude sensor 104a–d and the reference clock 105a d are typically in electric communication with and, to varying degrees, controlled by the processor 103a–d.

Figure 2:
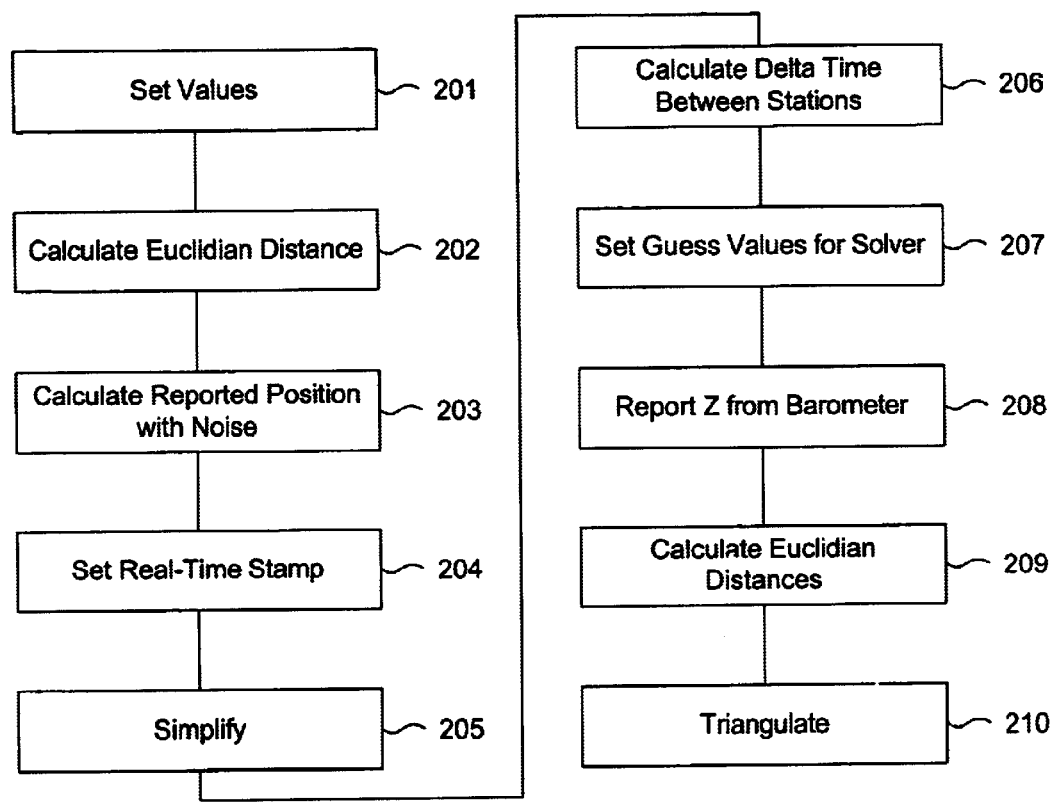
FIG. 2 is a process flow chart of one preferred embodiment of the method of this invention.

FIG. 2 shows a process flow chart of one preferred embodiment of the method of this invention. If the signal received from the device to be located is received by, four or more receiving sites, the TDOA triangulation method as follows is performed. Alternatively, if the signal received from the device to be located is received only by three receiving sites, an assumption is initially made that the three sites and the device are all in the same plane. The z-value of the solution to the mean fixed altitude of all three sites is constrained and the following TDOA triangulation method is performed as follows. This approach obtains an approximate position of the device to be located. Then a surface interpolation of each site's barometric altitude is performed and the difference in altitude between the device's reported barometric altitude and the site's interpolated barometric altitude is used to compute an actual z-altitude of the device to be located, based on the known z-altitudes of the sites. The altitude estimate of the device to be located is used to constrain the z-value of the site (which did not receive a signal from the device) having the unknown xyz position and the TDOA triangulation method, as follows, is performed. This approach provides a resulting xyz position that is the current best estimate of the position of the device to be located.

The present TDOA triangulation process of this invention is detailed in FIG. 2. The initial values are set 201. These initial values typically include such constants as feet to miles and the positions of the towers (base station sites). The Euclidian distances between the site vectors are calculated 202. The reported position is calculated 203 with noise. The realtime stamp is set 204. The time stamp is simplified 204 so that scaling problems, not critical to location determination, are removed. The delta times are calculated 206 between the stations. A guess value for the solver is set 207. The z value is reported 208 from the altitude sensor (typically a barometer). The Euclidean distances of the sites and unknown devices are calculated 209. The location of the unknown device is then triangulated 210. This triangulation 210 step can include the generation of deviation statistics and error correction as further described as follows.

Although the range differences calculated from the data provided by each site 101a–d can drift over the combined circular error probability (CEP) of the GPS receivers 102a–d. The resulting error in the range difference data is corrected, in the present embodiment of the invention, by (1) determining the actual xyz location of each site from map or survey data; (2) calculating the error between the reported xyz position of the base station 101a–d from the base station GPS receiver 102a–d; (3) collecting range difference data from xyz positions from each GPS receiver 102a–d relative to the known locations of the base station sites; and (4) use the range difference data, in the simultaneous equations with the base station site locations set from the known xyz locations to converge on the correct location position.

The described embodiment of this invention is to be considered in all respects only as illustrative and not as restrictive. Although specific steps and associated formulas are provided, the invention is not limited thereto. The scope of this invention is, therefore, indicated by the claims rather than by the foregoing description. All changes, which come within the meaning and range of equivalency of the claims are to be embraced within their scope.

What is claimed is:

1. A system for the determination of the relative time of arrival of a device transmission, comprising:
   (A) a first base station, said first base station further comprising:
   (1) an antenna system;
   (2) a global positioning system receiver in communication with said antenna system;
   (3) a processor in communication with said global positioning system receiver;
   (4) an altitude sensor in communication with said processor; and
   (5) a reference clock in communication with said processor; and
   (B) a program executing on said processor, said program determining the relative time of arrival of said device transmission to said first base station.

2. A system for the determination of the relative time of arrival of a device transmission, as recited in claim 1, further comprising a second base station.

3. A system for the determination of the relative time of arrival of a device transmission, as recited in claim 2, further comprising a third base station.

4. A system for the determination of the relative time of arrival of a device transmission, as recited in claim 3, further comprising a fourth base station.

5. A system for the determination of the relative time of arrival of a device transmission, as recited in claim 4, wherein said program executing on said processor, further comprises a time difference of arrival technique receiving time of arrival information from said base stations and calculating the range differences from said transmitting device to said base stations.

6. A system for the determination of the relative time of arrival of a device transmission, as recited in claim 5, wherein said time difference of arrival technique further comprises a Euclidian calculation of said range differences.

7. A system for the determination of the relative time of arrival of a device transmission, as recited in claim 5, wherein said time difference of arrival technique calculates three-dimensional ranges.

8. A system for the determination of the relative time of arrival of a device transmission, as recited in claim 1, wherein said global positioning system synchronizes said base stations to a clock standard.

9. A system for the determination of the relative time of arrival of a device transmission, as recited in claim 1, further comprising an error correcting processes.

10. A system for the determination of the relative time of arrival of a device transmission, as recited in claim 1, wherein said transmitting device is mobile.

11. A system for the determination of the relative time of arrival of a device transmission, as recited in claim 5, wherein said time difference of arrival technique further comprises a triangulation of a location for said transmitting device from three or more relative times of arrival from said transmitting device to said three or more base stations.

12. A method for the determination of a mobile transmitting device, comprising:
   (A) receiving a signal from said transmitting device to a plurality of base stations;
   (B) determining the number of said plurality of base stations, which received, said signal;
   (C) triangulating the location of said transmitting device from a plurality of distances between said transmitting device and said plurality of base stations,
   wherein said plurality of base stations further comprise:
   (1) a GPS receiver;
   (2) a processor in communication with said GPS receiver;
   (3) an altitude sensor in communication with said processor; and
   (4) a reference clock in communication with said processor.

* * * * *

UNITED STATES PATENT AND TRADEMARK OFFICE
CERTIFICATE OF CORRECTION

PATENT NO. : 6,943,729 B2
DATED : September 13, 2005
INVENTOR(S) : W. Kurt Dobson It is certified that error appears in the above-identified patent and that said Letters Patent is hereby corrected as shown below:

Column 1,
Line 67, replace "method'" with -- method --.

Column 4,
Line 6, replace "$(T_0T_2)$" with -- $(T_0-T_2)$ --.
Line 44, replace "105a d" with -- 105a-d --.

Signed and Sealed this

Third Day of January, 2006

JON W. DUDAS
*Director of the United States Patent and Trademark Office*